Feb. 6, 1934.　　　G. W. CORNELIUS　　　1,945,520
AIRCRAFT
Filed April 1, 1931　　　4 Sheets-Sheet 1
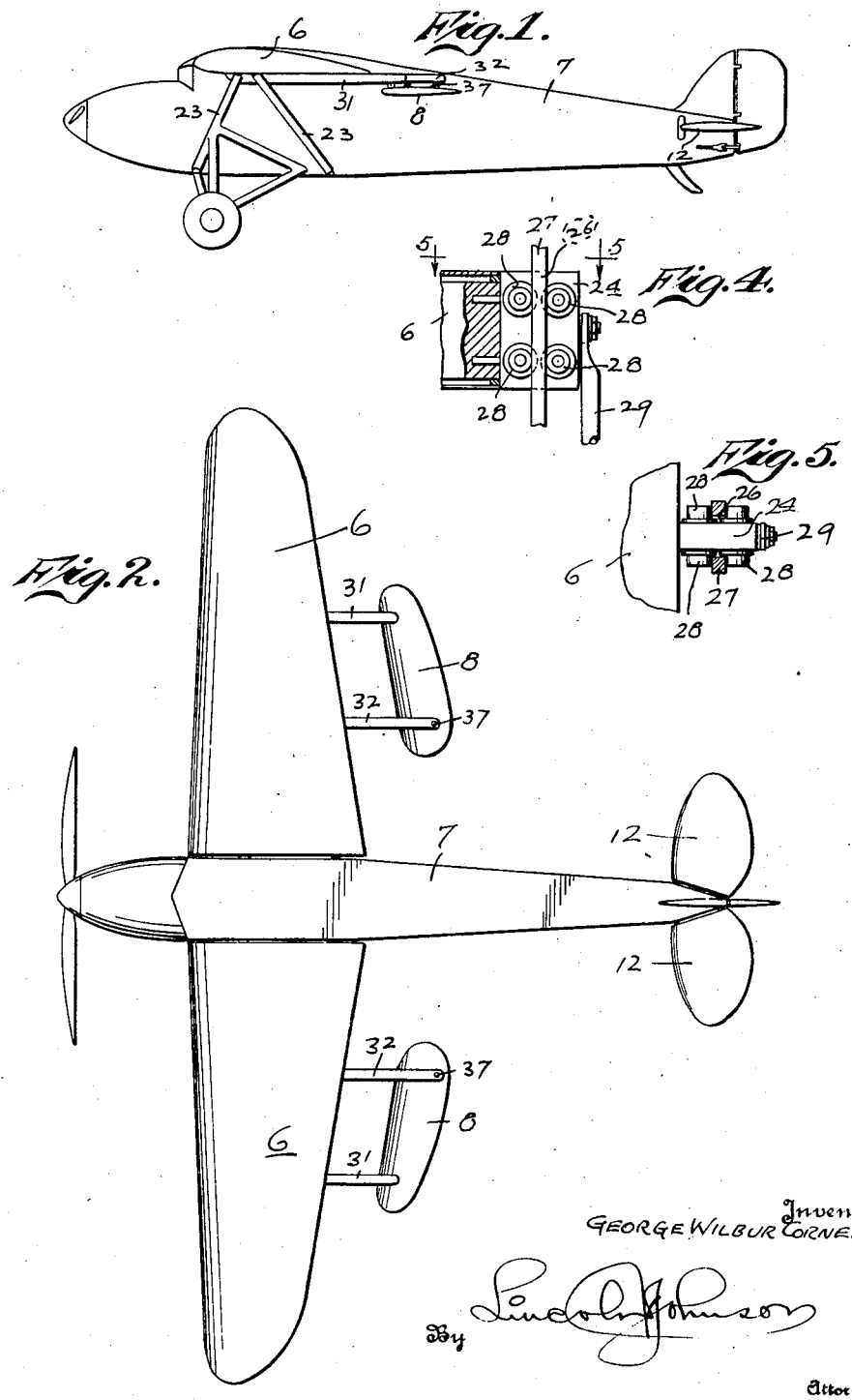

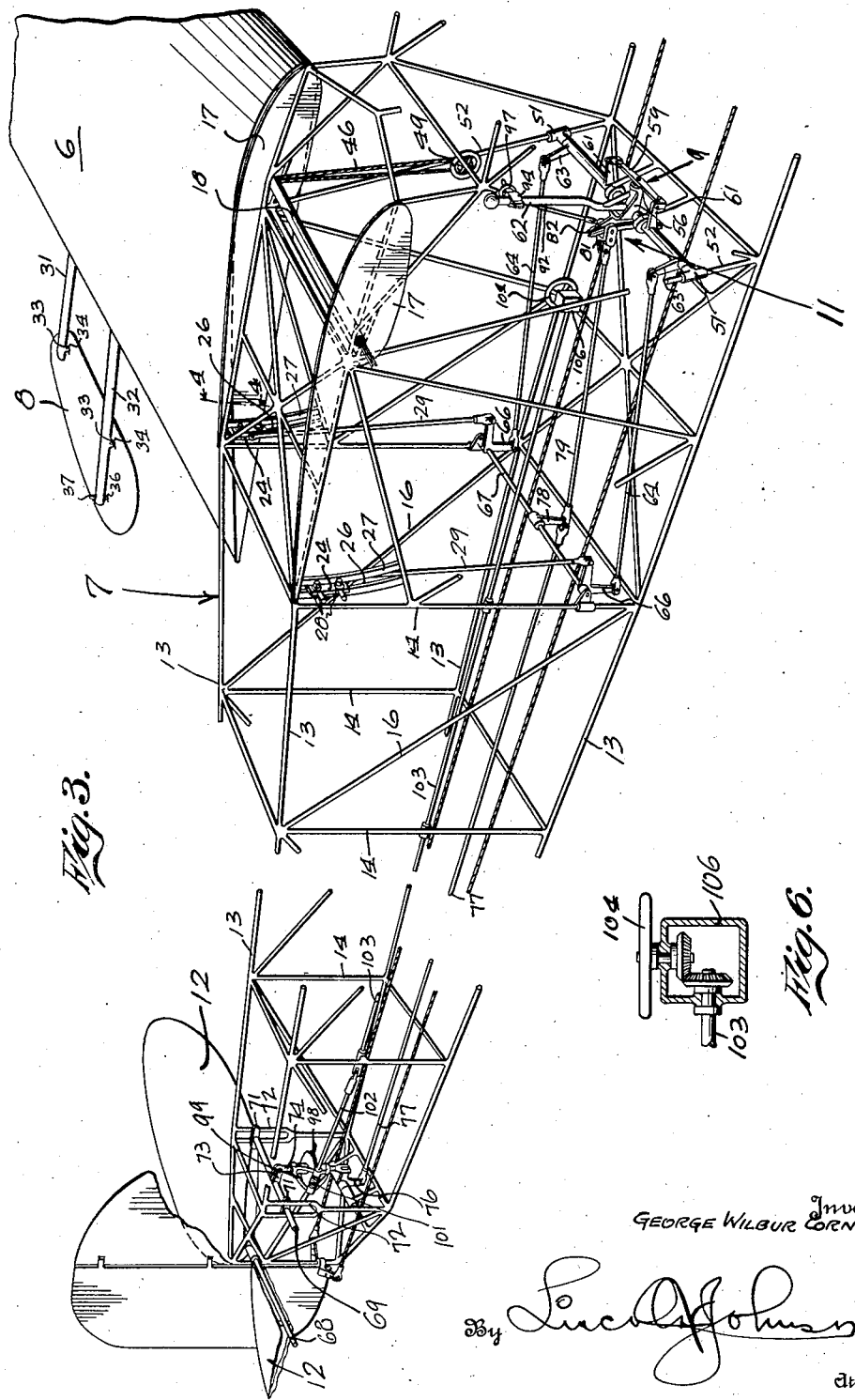

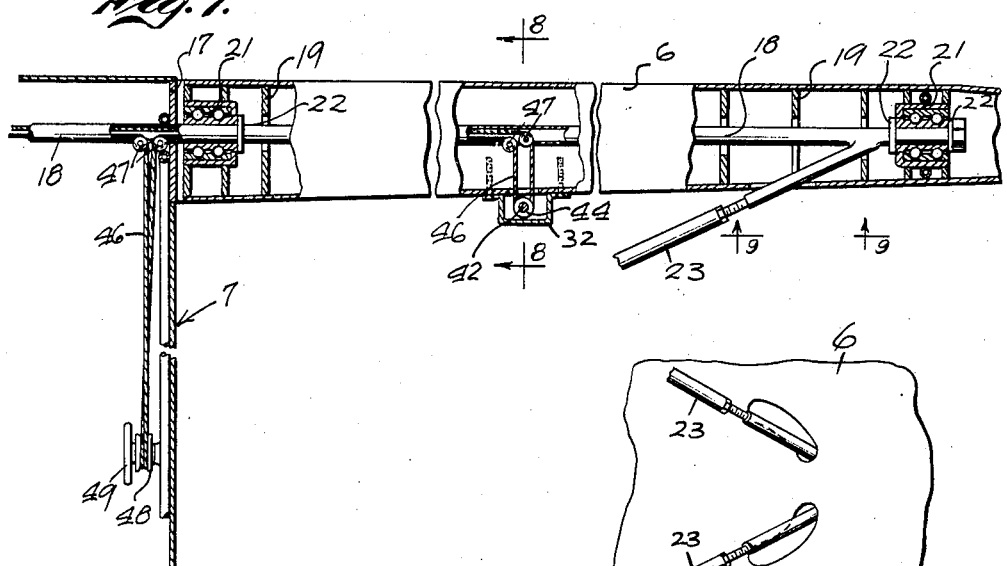
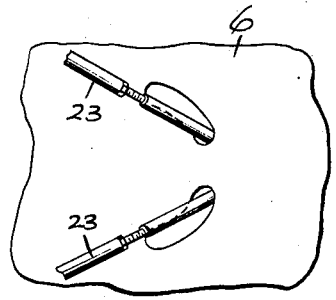
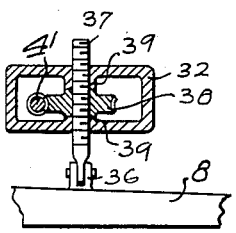
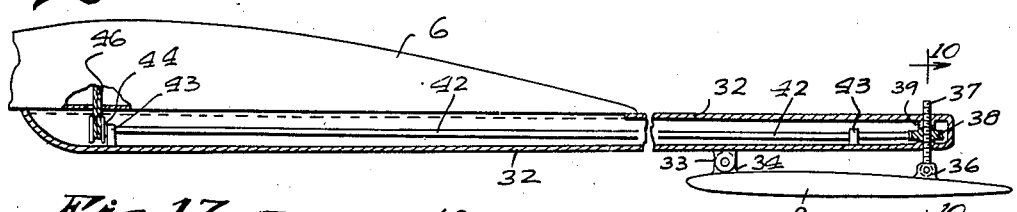
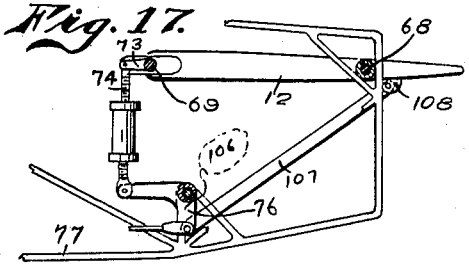

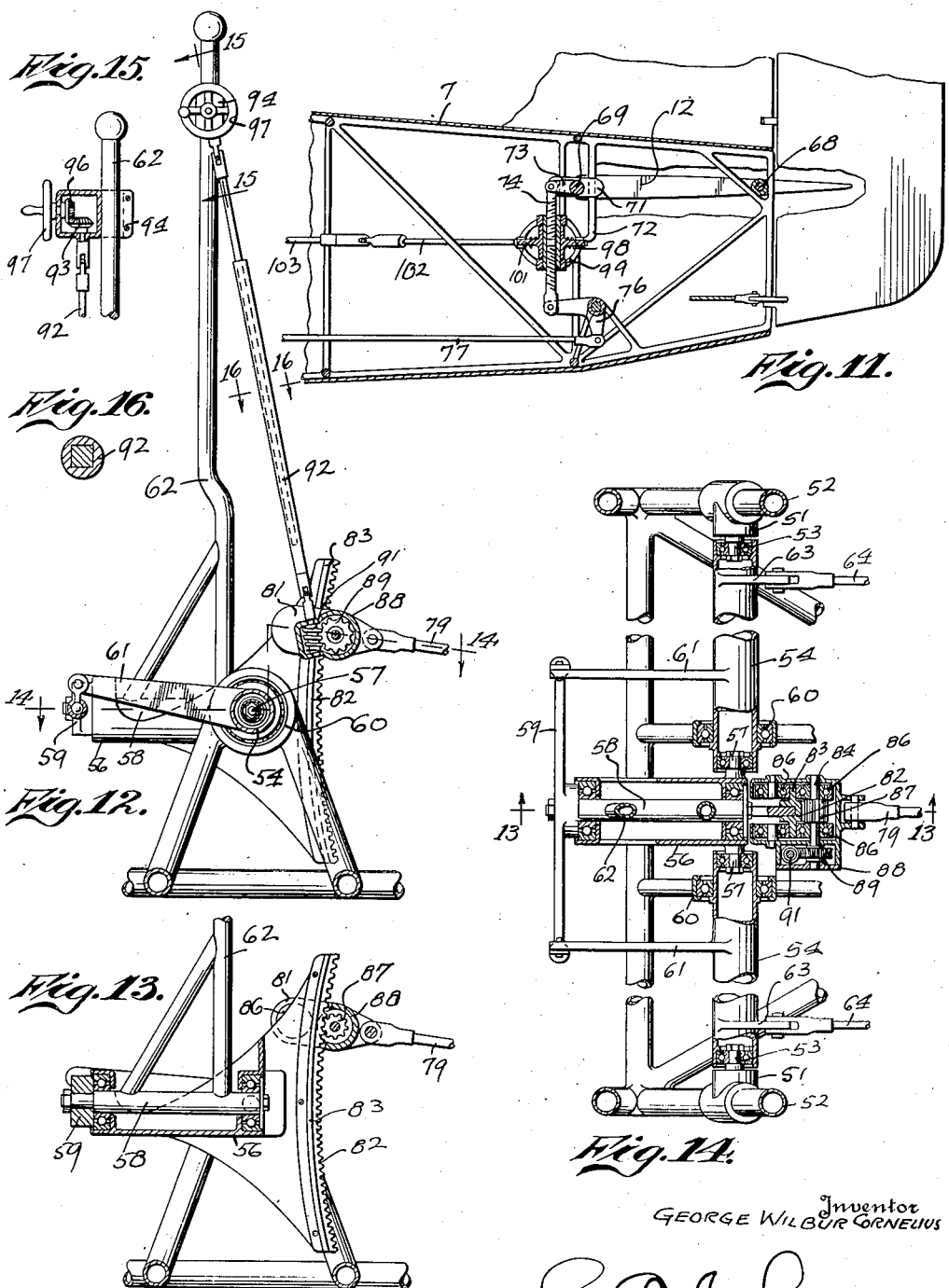

Patented Feb. 6, 1934

1,945,520

UNITED STATES PATENT OFFICE 1,945,520

AIRCRAFT

George Wilbur Cornelius, Glendale, Calif.

Application April 1, 1931. Serial No. 526,796

10 Claims. (Cl. 244—29)

This invention relates to aircraft.

The primary object of the invention is the provision of automatically adjustable sustaining planes for aircraft, and particularly for airplanes, whereby the attitude of the airplane is adjusted to be constant without hindering the usual manual control of flight; the mechanism herein provided automatically varies the angles of attack of the sustaining planes of the airplane, so that, whenever manual control of the airplane ceases, the airplane automatically assumes a predetermined constant attitude and is constantly maintained in that attitude regardless of variations of pressure conditions on the said sustaining and control planes; thus the airplane can be automatically maintained in a constant level flight, or constant gradual bodily climbing attitude, or gliding attitude and the like.

Particularly it is an object of the invention to obviate the use of ailerons, and utilize the airplane wings so as to compensate for any tendency of the shifting of the center of pressure, this being accomplished by the use of an adjustable stabilator on each wing so arranged as to exert a righting moment around a lateral axis, around which axis the wings are freely turnable to various angles of attack; the stabilators being exposed to the air currents behind the trailing edges of the respective wings and being spaced from said trailing edges; the adjustment of the stabilator to a certain angle of attack determines the attitude in which the airplane is constantly maintained, consequently temporary change of attitude of the airplane can be accomplished by manual control, but a constant attitude of any kind is obtained by the adjustment of the stabilators; the stabilators being so adjusted as to maintain the wings at a desired angle of attack and also to compensate for the shifting of the center of pressure, due to variations of air conditions; operative connection being provided between the wings and the elevator, or movable stabilizer of the airplane so that the angles of attack of the wings and of the elevator are automatically varied in unison to compensate for any airflow that tends to change the adjusted attitude of the airplane; the wings thus are also automatically actuated in the nature of ailerons.

Other objects and advantages are to provide aircraft that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawings wherein,

Fig. 1 is a side view of an airplane constructed in accordance with my invention.

Fig. 2 is a plane view of the airplane.

Fig. 3 is a perspective view of the skeleton or frame of the airplane, showing the control and connecting mechanisms of the wings and of the elevator, one of the wings being shown on the frame, partly broken away.

Fig. 4 is a sectional detail view of the guiding connection of the wing to the fuselage, the section being taken on the line 4—4 of Fig. 3.

Fig. 5 is a sectional plane view of the connection shown in Fig. 4, the section being taken on the line 5—5 of Fig. 4.

Fig. 6 is a sectional view of the manual adjusting mechanism for the elevators.

Fig. 7 is a sectional view of one of the wings on the fuselage and of the stabilator adjusting mechanism.

Fig. 8 is a sectional view of the stabilator support, and adjusting mechanism, the section being taken on the line 8—8 of Fig. 7.

Fig. 9 is a fragmental bottom plane view of the wing showing the reinforcing strut connection.

Fig. 10 is a sectional view of the adjustable mounting of the stabilator, the section being taken on the line 10—10 of Fig. 8.

Fig. 11 is a sectional view of the elevator mounting on the tail end of the fuselage.

Fig. 12 is a side view of the freely movable, manual control mechanism.

Fig. 13 is a sectional view of the adjustable control mechanism, the section being taken on the line 13—13 of Fig. 14.

Fig. 14 is a sectional plane view of the control mechanism, the section being taken on line 14—14 of Fig. 12.

Fig. 15 is a fragmental sectional view of the elevator reversing adjustment on the control stick, the section being taken on the line 15—15 of Fig. 12.

Fig. 16 is a sectional view of a connecting element of the elevator reversing mechanism, the section being taken on the line 16—16 of Fig. 12.

Fig. 17 is a fragmental detail view of an elevator control provided with added leverage.

An aircraft must be capable of movement primarily in three dimensions. There are three axes about which the airplane may move, namely, a longitudinal axis that passes from the front to the rear of the fuselage, about which a rolling motion of the aircraft takes place, whenever the ailerons are operated; a lateral axis passing from wing tip to wing tip about which a pitching movement takes place, this being usually controlled by elevator flaps which regulate the rise and fall of the tail; and the vertical axis passing through the center of gravity of the aircraft, and is the pivotal point around which the yawing movement takes place, controlled by a vertical rudder.

To secure stable equilibrium of the aircraft the center of lift or pressure should be directly above the center of gravity, on the said vertical axis, when the aircraft is in normal flying position. In modern airplane designs, the center of pressure in some instances, is behind the center of gravity so as to create a slightly nose heavy condition in flight. The center of pressure shifts according to the angle of attack, and flying speed. Equilibrium in such instances is usually obtained by manipulating the tail controls. There is also, to some extent, a variation in the air pressure upon a plane in flight which cannot be absolutely predetermined on account of changes in wind movement and temperature as well as altitude of plane. The pressure upon a given area is never constant, and the center of pressure on an aerofoil shifts constantly, and there is usually a tendency of considerable variation between the center of pressure and the center of gravity. For example, a gust of wind striking one side of an airplane in a position of equilibrium, produces added lift on that side if it strikes under the wing, and added weight on the side where its force is exerted if it strikes the upper part of the wing. This movement is counteracted in airplanes of standard design, by altering the position of the ailerons from a neutral position so that the one on the high side is tilted up so the air strikes its upper surface and pushes the high wing down while that on the low side is tilted down so the air pressure strikes its under surface and tends to lift the low wing up.

Normally increased lift on both wings tends to pitch the nose of the plane upwardly because the center of pressure shifts toward the leading edge of the wing, and decreased lift tends to pitch the plane downwardly, because the center of pressure shifts toward the trailing edge of the wing.

The main problem that confronts airplane designers who are working on airplanes to be flown by persons of ordinary skill, as contrasted to those to whom flying is a "sixth sense" is that of ready control and equilibrium, especially control at low flying speeds. The aim of designers is to call for a minimum manual control of the aircraft. In this respect much depends on the relative locations of the center of pressure and center of gravity.

Furthermore the speed of the airplane in flight, as well as its general attitude depends on the angle of attack of its aerofoils. This angle of attack must conform to the air conditions and must be variable to a certain extent. At the same time, the wing must be adjustable, to a normal desirable angle of attack, subject to slight automatic variations, so as to maintain the airplane in the selected constant attitude. The slight automatic variations of angle of attack are required to prevent divergence from the constant attitude.

To accomplish the aforesaid improvements, I connect the wings 6 of the airplane to the fuselage 7, with freedom of limited turning movement around a lateral axis. On each wing 6 an auxiliary wing or "stabilator" 8 is provided. The stabilator 8 is spacedly disposed behind the trailing edge of the wing 6 and it is adjustable around a lateral axis to various angles of attack. The wings 6 are operatively connected to each other by a control mechanism denoted in its entirety by the numeral 9. This control mechanism is free to follow the self-adjusting variations in the angles of attack of the wings 6, when not otherwise manipulated.

An adjustable connecting mechanism 11 connects the movable stabilizer or elevator 12, on the tail end of the fuselage 7, to the control mechanism 9 so that the elevator is moved in unison, and by the wings 6. This connection is reversible to allow the elevator movement either in the same direction as that of the turning of the wings 6, or in a direction opposite to the latter. In some instances however, the elevator is operated only in the usual manner.

In detail the fuselage 7 consists of longérons 13, struts 14, and stays 16 constructed to form a stream line frame in the usual manner. Opposite the inner end of each wing 6 is a plate 17 secured on the outside of the fuselage 7. A spar 18 extends laterally through both plates 17 and beyond said plates outside of the fuselage 7 to form the pivot support for the wings 6.

Each wing 6 has parallel wing ribs 19 disposed at right angles to the spar 18 and provided with openings through which the said spar 18 extends. At the inner end of the wing 6, and at a point intermediate the ends of the wing 6, are mounted ball bearings 21 to rotatably connect the wing 6 to the spar 18, the latter having fixed collars 22 thereon to prevent lateral movement of the bearing 21 and the wing 6 thereon. The usual desired aerofoil is formed on the wing ribs 19. A pair of diagonal stays 23 extend from the spar 18 adjacent the outer bearing 21. The stays 23 are sectional, and of adjustable length, and are connected to the fuselage 7, adjacent the bottom thereof, as clearly shown in Fig. 1.

A block 24 is fastened to the inner end of each wing 6 at a point between the spar 18 and the trailing edge of the wing 6. The block 24 is flattened to slidably extend through an arcuate slot 26 of a guide sector 27, which latter is secured to the fuselage 7. There is such a guiding arrangement on each side of the fuselage 7. The center of the arcuate guide slot 26 is on the pivotal axis of the wing 6. On the opposite sides of the block 24 are disposed rollers 28. There are two pairs of vertically aligned rollers 28, on each side of the flat block 24, a pair on each side of the slot 26, riding on the opposite outer faces of the sector 27 to slidably confine the block 24 in the said sector 27.

To the free inner end of each block 24 is pivotally secured an end of a connecting rod 29, by means of which each wing 6 is operatively connected to the control mechanism 9. As heretofore stated, the control mechanism is such as to allow the free movement of the wings 6 around the lateral axis of the spar 18. This free turning movement of the wings 6 is limited by the length of the arcuate slots 26 of the sectors 27, or by suitable stops on the control 9, not shown.

Each stabilator 8 is supported on a bar 31 and on a tubular support 32, both extending from the wing 6 rearwardly beyond the trailing edge of the wing 6. A lug 33 is extended downwardly from the bar 31, and a similar lug 33 is provided on the support 32. The stabilator 8 has upwardly protruding ears 34 adjacent the leading edge thereof, which ears 34 are pivotally secured to the respective lugs 33. The support 32 extends below the lower surface of the wing beyond the lateral axis of the same. The outer end of the support 32 extends over the top of the stabilator 8 to a point adjacent the trailing edge of the latter. An ear 36 is provided on the stabilator 8 opposite the end of the support 32, and a stabilator adjusting mast 37 is pivotally secured to the ear 36. The mast 37 is externally threaded and extends vertically through the tubular support 32. The mast 37 threadedly engages the central aperture of a gear 38, the latter being held against axial movement between opposed bosses 39 inside of the support 32. A worm 41 engages the gear 38. The worm 41 is formed on an adjusting rod 42, which latter is rotatably supported in bearings 43 inside of the tubular support 32. On the end of the rod 42 below the spar 18 is fixed a pulley 44. It will be noted that the spar 18 is also tubular and has openings on its side above the pulleys 44. An endless cable 46 extends around the pulley 44 into the wings 6 and through the tubular spar 18. The cable 46 is properly guided into and out of the spar 18 around pulleys 47. The same cable 46 works around the pulleys 44 of both stabilator adjusting mechanisms, to simultaneously adjust the angles of attack of both stabilators 8.

An intermediate portion of the cable 46 is extended downwardly from the spar 18 into the fuselage to work around a sheave 48 rotatably mounted on the inside of the fuselage 7, adjacent the pilot's controls. The sheave 48 has a handle wheel 49 thereon, whereby it can be rotated so as to pull the cable 46. The movement of the cable 46 rotates the pulleys 44 and the rods 42, so that the worms 41 rotate the gears 38 thereby to axially move the masts 37 in the gears 38. This movement of the masts 37 raises or lowers the stabilators 8 around the pivots thereof, to the desired angles of attack. The stabilators are held in any adjusted position relatively to the wings 6, by reason of the engagement of the masts 37 with the respective gears 38.

The control mechanism 9 includes opposed bearing brackets 51, secured to opposite struts 52 of the fuselage 7. Each bracket 51 terminates in a short stud 53 on which is mounted an end of a sleeve 54. Centrally disposed between the sleeves 54 is a bracket 56, from the opposite sides of which extend bearing studs 57 on which are rotatably mounted the inner ends of the respective sleeves 54, by means of suitable ball bearings. Thus the sleeves 54 are rotatable in the same direction with the bracket 56 as well as oppositely to each other around the studs 57. The outer periphery of each sleeve 54 is rotatably supported on a roller bearing bracket 60, which latter is fixed on the fuselage.

In the central bracket 56 is mounted a shaft 58, disposed at right angles to the axis of the sleeves 54. The shaft 58 is rotatably supported in suitable ball bearings in the bracket 56, so as to be prevented from axial displacement. On the end of the shaft 58, nearer to the nose of the plane, is fixedly secured a cross bar 59, the opposite ends of which latter are pivotally connected to lever arms 61 extending from the respective sleeves 54.

A control stick 62 is fixedly secured on the shaft 58. When the stick 62 is swung back and forth, the bracket 56 and the sleeves 54 are rotated as a unit, in the same direction on the bearing studs 53. When the stick 62 is swung from side to side, then the bracket 56 remains stationary and the shaft 58 is rotated in the bracket 56. The cross bar 59 is turned by the shaft 58 so that one end thereof moves upwardly, and the other end thereof downwardly, whereby the sleeves 54 are rotated in opposite directions relatively to each other on the respective bearing studs 53 and 57.

On each sleeve is an upwardly and rearwardly extended arm 63. Each arm 63 is connected by a link 64 to a downwardly extended arm of a bell crank lever 66. The bell crank levers 66 in turn are rotatably mounted on a cross rod 67 fixed in the fuselage 7. The lower ends of the connecting rods 29 are pivotally connected to the ends of the other arms of the respective bell crank levers 66. Thus the automatic self-adjusting movements of the wings 6 are transmitted to the control mechanism without being hindered by said mechanism, and whenever manual control is required, it can be readily accomplished by suitable manipulation of the control stick 62.

There is no fixed stabilizer surface on the airplane as herein illustrated but it may be provided, if necessary. The elevator 12 is pivoted on a lateral pivot rod 68 which is supported on the tail end of the fuselage 7. The pivotal support of the elevator 12 is nearer to the trailing edge than to the leading edge of the elevator 12. The said elevator is made in two sections, one on each side of the fuselage 7. The inner corners of the leading edges of the sections of the elevator 12 are connected to each other by a bar 69, which has slide shoes 71 thereon bearing on the faces of the respective vertical guide yokes 72 on the opposite sides of the fuselage 7. Lugs 73 extend forwardly from the rod 69 at about midway between the shoes 71. The upper end of an externally threaded elevator mast 74 is pivotally secured to said lugs 73. The lower end of the elevator mast 74 is pivotally secured to a horizontal arm of a bell crank lever 76 keyed on the shaft 75, journaled in the fuselage 7. The downwardly extended arm of the lever 76 is connected by a link 77 to a downwardly extended arm 78 swingably suspended from the cross rod 67. Another link 79 connects the end of the arm 78 to a housing 81, which forms a part of the reversible connection between the controlling mechanism and the elevator actuating elements.

The aforementioned reversible connection includes a vertical, concave, toothed rack 82 fixedly secured to the end of the central bracket 56 of the said controlling mechanism 9. The rack 82 is so disposed as to move in a direction opposite to the direction of the movement of the bracket 56 around the axis of the studs 53. The rack 82 has lateral guide rails 83 extending from the opposite sides thereof. The housing 81 extends over and beyond said rails 83. A shaft 84 is journaled in the housing 81 opposite the rack 82. Ball bearing rollers 86 on the shaft 84 ride on the rails 83. Other ball bearing rollers 86 in the housing 81 are arranged to ride on the other faces of the rails 83 so as to positively guide the housing 81 on an arcuate path over the rack 82.

A pinion 87 is fixed on the shaft 84 so as to be in mesh with the teeth of the rack 82. The shaft 84 extends into a smaller casing 88 on one side of the housing 81 and it has a gear 89 secured thereon within the said casing. The gear 89 is engaged by a worm 91, which latter is connected by a pivoted telescoping link 92, to a bevel gear 93, which is disposed in a gear casing 94 fixed to the control stick 62. Another bevel gear 96 is in mesh with the gear 93 in the casing 94. A hand wheel 97 outside of the casing 94 is secured on the pin of the gear 96, to allow rotation of the gears 93 and 96 thereby.

In the position shown in Fig. 15, the housing 81 is above the pivot of the connecting mechanism 9, consequently when the stick 62 is swung forwardly and rearwardly, the rocking of the bracket 56 moves the link 79 in the same direction as the stick 62 is swung. For example, when the angle of attack of both wings 6 is increased, the stick 62 is swung toward the tail of the plane, thus the link 79 is also moved rearwardly. This movement is transmitted through the link 77 to the bell crank lever 76 to move the elevator mast 74 downwardly, thereby to lower the leading edge of the entire elevator 12 to a smaller angle of attack. On the other hand the decreasing of the angle of attack of the wings 6, similarly increases the positive angle of attack of the elevator 12.

If it is desired to tilt the elevator 12 in the direction of the turning of the wings 6, then the hand wheel 97 is rotated, to cause the rotation of the worm 91 and gear 82, thereby causing the pinion 87 to ride downwardly on the rack 82 past the pivotal center of the control mechanism 9. The lengthening of the distance between the housing 94 and the housing 81 is compensated for by the telescoping link 92. It is to be noted that one section of the link 92 is rectangular and is slidable in the rectangular aperture of the other section of the link 92, which is hollow. This is necessary to allow the transmission of rotation through the telescoping link 92. In the last mentioned position, the housing 81 is swung in a direction opposite to the fore and aft rocking movement of the stick 62. Thus the aforesaid reversible connection permits the adjustment of the elevator 12 either in the same direction as the wing adjustment, or oppositely to the latter. The reversible connection may be adjusted to determine the degree of coaction between the wings 6 and the elevator 12.

The initial, normal elevator position is also adjustable. A gear 98 has a threaded central hole engaging the elevator mast 74. The gear 98 is supported on a bracket 99 so as to be held against axial displacement. A worm 101 in the same bracket 99 engages the periphery of the gear 98. A rod 102 extends from the worm 101 and is universally connected to a rotary rod 103, which latter is supported in suitable bearings on the inside of the fuselage 7. A hand wheel 104, in the pilot compartment, is connected to suitable gear transmission in a casing 106 on the side of the fuselage 7. The said rod 103 is connected to said last mentioned gear transmission to be rotatable thereby.

Whenever the hand wheel 104 is rotated, it rotates the rods 103 and 102, and the worm 101, which in turn rotates the gear 98 causing the axial adjustment of the elevator mast 74. In this manner the normal angle of attack of the elevator 12 relatively to the normal wing positions is adjustably determined for any attitude of the airplane.

In operation, during the take off of the airplane the connection between the control mechanism and the elevator actuating mechanism is such that the wings 6 and the elevator 12 turn in the opposite directions around their respective lateral axes. The connection adjustment at take off is shown in Figs. 12 and 13. After the airplane is taxied to position, and it is started for the take off, the stick 62 is moved forwardly thereby decreasing the angle of attack of the wings 6 and increasing the positive angle of attack of the elevator 12. The elevator 12 thus lifts the tail of the airplane bringing the wings 6 into a "no-lift" position. The resistance of the wings 6 is thus materially reduced and the airplane rapidly attains fair speed for the take off. The position of the elevator 12 at positive angle of attack also keeps the airplane from leaving the ground until it reaches its proper flying speed.

When the proper flying speed is attained, the control stick 62 is pulled back slowly, whereby the trailing edges of the wings 6 are pulled downwardly, increasing the positive angle of attack of the wings 6; at the same time the leading edge of the elevator 12 is moved downwardly so that its angle of attack becomes slightly negative so as to gradually lower the tail of the airplane and point the airplane into the air.

After the machine is well up in the air the stick 62 is released. The wings and the elevator automatically adjust themselves so that the airplane is in equilibrium in the predetermined attitude. The stabilators 8 take the back-wash at their adjusted angle of attack, and this back-wash varies with varying pressure conditions, by reason of the leverage of the stabilators 8 around the lateral axis of the wings 6, a righting moment is exerted to automatically turn the wings 6 and elevator 12 therewith to the angles of attack required to maintain the attitude of the airplane under any conditions. When the flight stabilator 8 takes down-wash of air, it increases the angle of attack of the wings. Increased up-wash of air on the stabilators 8 turns the wings 6 to lesser angle of attack, maintaining the lift constant.

When straight level flight is required for a longer distance, the housing 81 is adjusted so as to work the elevator 12 in the same direction as the wings 6. In this attitude the angles of attack of the wings 6 and of the elevator 12 are increased and decreased simultaneously. The last mentioned adjustment prevents rapid pitching movement of the airplane. This adjustment is particularly adapted for gradual climbing. When it is necessary to climb to a higher altitude at a longer distance, then instead of pitching the airplane upwardly, the lift can be increased both on the wings and on the elevator, the airplane thus climbs bodily. The stabilators 8 are adjusted to this climbing attitude, by raising the trailing edges of the stabilators to decrease the positive angle of attack, thereby creating a moment around the lateral axis of the wings to hold the same at a larger angle of attack, increasing the lift. The elevator follows the wing adjustments, due to the reversed connection that moves the elevator in the same direction as the turning of the wings 6. The advantage of this bodily climbing of the airplane is that the unevenness of air conditions does not oscillate or bump the plane as violently as they would if the plane was meeting the air waves in upwardly pitching attitude.

If the airplane is longitudinally unbalanced, the normal angle of attack of the elevator 12 is adjusted manually by turning the wheel 104, until the tail is properly balanced. This adjustment can be made regardless of the position of the said reversible control connection.

Under all flying circumstances the wings 6 operate as ailerons, due to the aforesaid balancing, righting action of the stabilators 8. Beyond the usual range of adjustment of the wings 6, 3° negative play is provided at the uppermost adjustment, and 3° positive play is provided beyond the lowermost wing adjustment, said play at each extreme being allowed for aileron action. For example, if the range of adjustment of the wings 6 is from no-lift angle to positive 10° angle of attack, then a 3° negative aileron play, and 3° positive aileron play beyond the 10° angle of attack, is provided.

At increased speed of level flight, the elevator turning oppositely to the wings 6, the stabilators 8 cause the wings 6 to level out, and maintain the same lift with the greater forward speed.

In the event of lateral unbalance, the pressures on the stabilators 8 work in opposite directions, turning the wings 6 in opposite directions. At this time the wing adjustment swings the stick 6 from side to side, but does not move the elevator. Any compound self-adjustment is thus readily accomplished.

When landing the engine is shut off, thus the angle of attack of the wings 6 is automatically increased, due to the gravity of the wings and to reduced airflow; the reversible connection is adjusted as shown in Fig. 12. The increase of the angle of attack of the wings 6 turns the elevator 12 to negative angle of attack, lowering the tail of the airplane to landing angle, so that the airplane is held in gliding position. If the engine is not shut off, then the stabilators 8 must be adjusted to landing angle. After coming into the field at landing angle, the pilot "gives it the gun" and flattens out the position of the plane.

It will be recognized that the sustaining planes and their control adjustment herein provided, allow the automatic maintenance of a set, predetermined attitude of the airplane; the stabilators maintain the center of pressure constant over the center of rotation, or center of gravity; there is automatic self-adjustment of unbalanced weight at tail, or for lateral balance; aileron action of opposite rotation of the wings 6 is automatic, according to flow of air, but all the aforementioned self-adjustments and automatic control are achieved without hindering manual control, because whenever necessary, the pilot can operate the control stick manually, sufficient leverage being provided to allow facile manual control of flight. The automatic adjustments and operating devices actuate only after the control mechanism is released. The yawing movement of the airplane is controlled by the usual rudder. The airplane is propelled by engine driven propellers, of any of the usual types. The landing gear and other parts of the airplane may be made of a customary design and construction to cooperate with the aforementioned novel sustaining planes and flight controlling mechanisms.

To provide more leverage for the manipulation of the elevator 12, additional leverage may be provided in the manner shown in Fig. 17. The ends of the shaft 75 are extended beyond the sides of the fuselage 7 and have downwardly extended arms 106 keyed thereon, which latter in turn are connected by links 107 to lugs 108 on the undersides of the respective sections of the elevator 12. The lugs 108 are disposed rearwardly of the pivotal support of the elevator 12 so as to impart a force to the elevator 12 in a direction opposite to the direction of force imparted to the elevator 12, at the slide shoes 71. In this manner the turning moments imparted to the elevator 12 on the opposite sides of the elevator fulcrum assist each other in manipulating the said elevator 12. The sections of the elevator 12 are so formed as to allow the free operation of a usual rudder therebetween, and additional auxiliary rudders may be provided on the upper faces of the individual elevator sections.

The airplane may be constructed with said wing controls and independent elevator controls not connected to the wing controls, in which case only the wing adjustments are automatic, the elevator being manually actuated.

The center of gravity on the model airplane built by me is located in the fuselage, less the weight of the wings. Therefore when the power is off and the speed of the plane recedes the wings droop, automatically taking a higher angle of attack, and as approximately three-fourths of the wings are back of the center of rotation thereof, the drooping of the wings naturally moves the center of gravity rearwardly. This gives the airplane automatic landing properties, that is, the airplane seeks a landing attitude of its own accord which at the same time is a minimum glide angle. It is to be noted that each of the wing units is in reality arranged as a small airplane, consisting of the wing proper with a tail in the form of the stabilator, which control the angle of incidence of the wing to which it is attached. When the controls 9 are not manually actuated, the angle of the main sustaining planes of the wings is controlled solely by the stabilators which are adjustable to be set to a position corresponding to a desired attitude of the entire aircraft. The stabilators may be adjusted independently of each other to the same or to different angles, and the wings then automatically adjust themselves according to varying air and speed, and load conditions, to maintain a required constant attitude of the entire aircraft.

Having thus described this invention, what I claim and desire to secure by Letters Patent is:

1. In an airplane, the combination of a fuselage; wings on the fuselage; means to support the wings on the fuselage so that the wings are rotatable around a lateral axis; means of connection between each wing and the fuselage, disposed between the trailing edge of each wing and said lateral axis to guide the rotative movement of the respective wings within the limits of predetermined arc; an auxiliary wing supported in spaced relation to the trailing edge of each wing so as to exert a righting moment on the respective wings by reason of the air pressure on the said auxiliary wings; adjustable means on the wings to maintain the auxiliary wings in a selected angular position; adjusting mechanisms extended from said adjustable supporting means through the respective wings and into the fuselage, whereby said adjustable supporting means are adjusted; and a control mechanism in the fuselage connected to said first wings through the said guiding means for manually controlling the angles of attack of the first wings, said last mentioned mechanism being adapted to allow free movement of the released control with the automatic wing adjustments.

2. In combination with an aircraft, wings connected to the aircraft with freedom of rotary movement around a lateral axis to various angles of attack; an elevator surface pivoted at the tail end of the aircraft; means of connection between the wings and the elevator for simultaneous adjustments of the same; and means related to the wings exerting a righting moment on said wings around the said axis according to the variation of air pressure on the wings, thereby to automatically change the angle of attack of the wings and of the elevator so as to maintain the aircraft at a constant attitude.

3. In combination with an aircraft, wings connected to the aircraft with freedom of rotary movement around a lateral axis to various angles of attack; an elevator surface pivoted at the tail end of the aircraft; means of connection between the wings and the elevator for simultaneous adjustments of the same; and means related to the wings exerting a righting moment on said wings around the said axis according to the variation of air pressure on the wings, thereby to automatically change the angle of attack of the wings and of the elevator so as to maintain the aircraft at a constant attitude, said means of connection between the wings and the elevator being reversible to cause the rotation of the elevator selectively in the same direction as the wings and in a direction opposite to that of the wing adjustment.

4. In combination with an aircraft, wings connected to the aircraft with freedom of rotary movement around a lateral axis to various angles of attack; an elevator surface pivoted at the tail end of the aircraft; means of connection between the wings and the elevator for simultaneous adjustments of the same; and means related to the wings exerting a righting moment on said wings around the said axis according to the variation of air pressure on the wings, thereby to automatically change the angle of attack of the wings and of the elevator so as to maintain the aircraft at a constant attitude, said righting means being adjustable relatively to the wings to determine the attitude in which the aircraft is maintained, said means of connection between the wings and the elevator, being reversible to cause the rotation of the elevator selectively in the same direction as the wings and in a direction opposite to that of the wing adjustment.

5. In combination with an aircraft, wings connected to the aircraft with freedom of rotary movement around a lateral axis to various angles of attack; an elevator surface pivoted at the tail end of the aircraft; means of connection between the wings and the elevator for simultaneous adjustments of the same; means related to the wings exerting a righting moment on said wings around the said axis according to the variation of air pressure on the wings, thereby to automatically change the angle of attack of the wings and of the elevator so as to maintain the aircraft at a constant attitude; freely movable control mechanism connected to said means of connection whereby the wings and the elevator may be controlled at will; and adjusting means for the elevator to adjust the angle of attack of the elevator surface relatively to the angle of attack of the wings.

6. In combination with an aircraft, wings connected to the aircraft with freedom of rotary movement around a lateral axis to various angles of attack; an elevator surface pivoted at the tail end of the aircraft; means of connection between the wings and the elevator for simultaneous adjustments of the same; means related to the wings exerting a righting moment on said wings around the said axis according to the variation of air pressure on the wings, whereby to automatically change the angle of attack of the wings and of the elevator so as to maintain the aircraft at a constant attitude; freely movable control mechanism connected to said means of connection whereby the wings and the elevator may be controlled at will; and adjusting means for the elevator to adjust the angle of attack of the elevator surface relatively to the angle of attack of the wings, said control mechanism being adapted to turn the wings in the same direction and also in opposite directions relatively to each other for aileron action.

7. In an airplane a fuselage; wings on the fuselage; means on the fuselage to support said wings with freedom of limited turning movement around a lateral axis, said support comprising a laterally extended spar on which the wings are journaled; a strut member extended from the spar at a point intermediate the ends of each wing, being connected to the fuselage to reinforce the wing support; a guide on each side fuselage adjacent the inner end of each wing; means of connection between each wing and the guide; a freely movable control mechanism connected to each of said means of connection to manually turn the wings at will selectively in the same direction, and in opposite directions to each other.

8. In an airplane a fuselage; wings on the fuselage; means on the fuselage to support said wings with freedom of limited turning movement around a lateral axis to various angles of attack, said support comprising a laterally extended member whereby the wings are rotatably held on the fuselage; a guide on each side fuselage adjacent the inner end of each wing; means of connection between each wing and the guide; a freely movable control mechanism connected to each of said means of connection to manually turn the wings at will selectively in the same direction, and in opposite directions to each other; an elevator on the tail end of the fuselage; and means to connect said elevator in unison with the variations of the angles of attack of the wings, said last mentioned means being adjustable to move the elevator selectively in the same direction as the wing movement, and in a direction opposite to the direction of turning of the wings.

9. In combination with an aircraft, wings connected to the aircraft with freedom of rotary movement around a lateral axis to various angles of attack; an elevator surface pivoted at the tail end of the aircraft; means of connection between the wings and the elevator for simultaneous adjustments of the same, said means of connection between the wings and the elevator being reversible to cause the rotation of the elevator selectively in the same direction as the wings and in a direction opposite to that of the wing adjustment.

10. In combination with an aircraft, wings connected to the aircraft with freedom of rotary movement around a lateral axis to various angles of attack; an elevator surface pivoted at the tail end of the aircraft; means of connection between the wings and the elevator for simultaneous adjustments of the same; freely movable control mechanism connected to said means of connection whereby the wings and the elevator may be controlled at will; and adjusting means for the elevator to adjust the angle of attack of the elevator surface relatively to the angle of attack of the wings, said control mechanism being adapted to turn the wings in the same direction and also in opposite directions relatively to each other for aileron action.

GEORGE WILBUR CORNELIUS.